United States Patent
Crompton et al.

(10) Patent No.: US 9,664,316 B1
(45) Date of Patent: May 30, 2017

(54) PRESS FITTING DEVICE, COMPONENTS AND METHOD

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/342,276

(22) Filed: Nov. 3, 2016

(51) Int. Cl.
F16L 17/00 (2006.01)
F16L 21/02 (2006.01)
F16L 19/00 (2006.01)

(52) U.S. Cl.
CPC .............. F16L 21/022 (2013.01); F16L 19/00 (2013.01)

(58) Field of Classification Search
USPC .................................. 285/382, 95, 340, 383
See application file for complete search history.

(56) References Cited

U.S. PATENT DOCUMENTS

| | | | |
|---|---|---|---|
| 3,064,983 A | 11/1962 | Halterman | |
| 3,066,961 A | 12/1962 | Gerin | |
| 3,632,141 A * | 1/1972 | Larsson | F16L 13/142 285/24 |
| 3,679,241 A * | 7/1972 | Hoffmann | F16L 19/086 285/340 |
| 3,885,821 A | 5/1975 | Philibert | |
| 3,915,480 A | 10/1975 | Kish et al. | |
| 4,107,452 A * | 8/1978 | Razvi | F16L 25/01 174/84 S |
| 4,146,254 A * | 3/1979 | Turner | F16L 37/091 285/105 |
| 4,275,909 A | 6/1981 | Yoshizawa et al. | |
| 4,372,586 A * | 2/1983 | Rosenberg | F16L 37/10 285/148.27 |
| 4,372,905 A | 2/1983 | Bohman | |
| 4,466,640 A | 8/1984 | Van Houtte | |
| 4,880,260 A | 11/1989 | Gotoh et al. | |
| 4,895,395 A * | 1/1990 | Ceriani | F16L 37/0915 285/340 |
| 4,997,214 A * | 3/1991 | Reese | F16L 47/24 228/173.4 |
| 5,108,134 A | 4/1992 | Irwin | |
| 6,012,743 A | 1/2000 | Godeau et al. | |
| 6,174,002 B1 * | 1/2001 | Rho | F16L 37/0915 285/308 |
| 6,427,309 B1 | 8/2002 | Viegener | |
| 6,634,074 B2 | 10/2003 | Wild | |

(Continued)

FOREIGN PATENT DOCUMENTS

| | | |
|---|---|---|
| EP | 1004805 | 5/2000 |
| EP | 2133612 | 12/2009 |

Primary Examiner — Aaron Dunwoody
(74) Attorney, Agent, or Firm — Williams Mullen; Thomas F. Bergert

(57) ABSTRACT

A press fitting device, components and method provide one or more indicators to provide a visual indication that the fitting has been properly pressed around a tube and that the correct amount of pressure has been provided to create a permanent seal. In embodiments, the present invention includes a fitting having a main body component with a packing arrangement including a sealing ring, a lock ring support member, a lock ring and a malleable and expandable indicator ring.

19 Claims, 9 Drawing Sheets

(56) References Cited

U.S. PATENT DOCUMENTS

| | | |
|---|---|---|
| 6,805,385 B2 | 10/2004 | Viegener |
| 6,843,516 B2 | 1/2005 | Bishop et al. |
| 6,851,728 B2 * | 2/2005 | Minami ................ F16L 19/086 |
| | | 285/113 |
| 7,178,836 B2 | 2/2007 | Hoff et al. |
| 7,686,346 B1 * | 3/2010 | Buccicone ............ F16L 41/021 |
| | | 285/129.1 |
| 7,823,932 B2 | 11/2010 | Webb et al. |
| 7,954,861 B2 | 6/2011 | Swift et al. |
| 8,118,331 B2 | 2/2012 | Yamashita et al. |
| 8,439,404 B2 | 5/2013 | Anton et al. |
| 8,491,012 B2 * | 7/2013 | LeQuere ............... F16L 37/091 |
| | | 285/340 |
| 8,517,431 B2 | 8/2013 | Arning et al. |
| 8,585,100 B2 | 11/2013 | Stults et al. |
| 8,888,145 B1 * | 11/2014 | Crompton ............. F16L 13/142 |
| | | 285/369 |
| 9,416,897 B2 | 8/2016 | Crompton et al. |
| 2003/0057701 A1 * | 3/2003 | Koo .................... F16L 37/0915 |
| | | 285/307 |
| 2003/0071460 A1 * | 4/2003 | Snyder, Sr. ........... F16L 37/091 |
| | | 285/340 |
| 2004/0239115 A1 * | 12/2004 | Wilk, Jr. ............... F16L 37/091 |
| | | 285/340 |
| 2006/0163870 A1 | 7/2006 | Goilot |
| 2011/0049875 A1 | 3/2011 | Stults et al. |
| 2012/0001414 A1 | 1/2012 | Arning et al. |
| 2015/0137515 A1 * | 5/2015 | Ratschmann ......... F16L 37/091 |
| | | 285/340 |
| 2015/0345683 A1 * | 12/2015 | Crompton ........... F16L 37/0915 |
| | | 285/340 |
| 2016/0161038 A1 * | 6/2016 | Crompton ............... F16L 37/26 |
| | | 285/340 |

\* cited by examiner

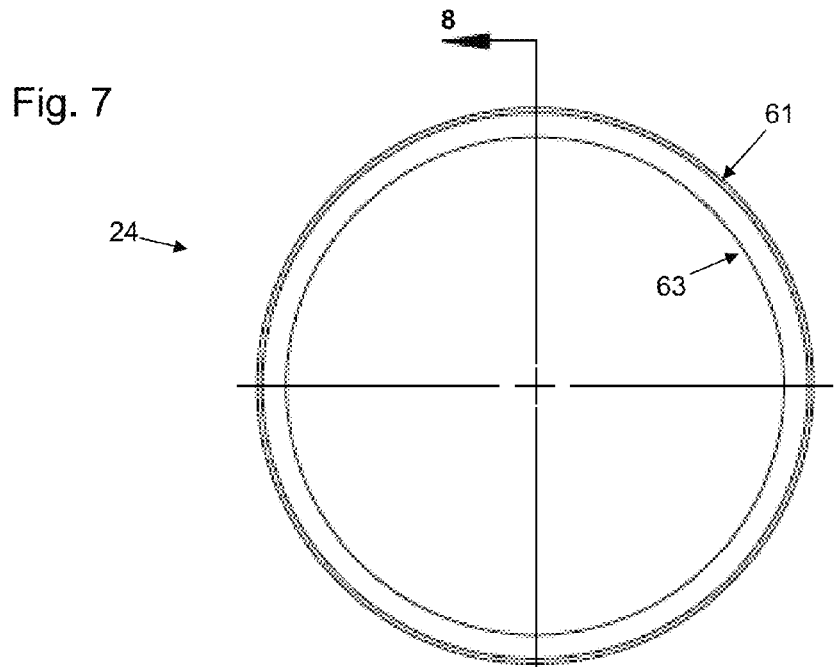
Fig. 7
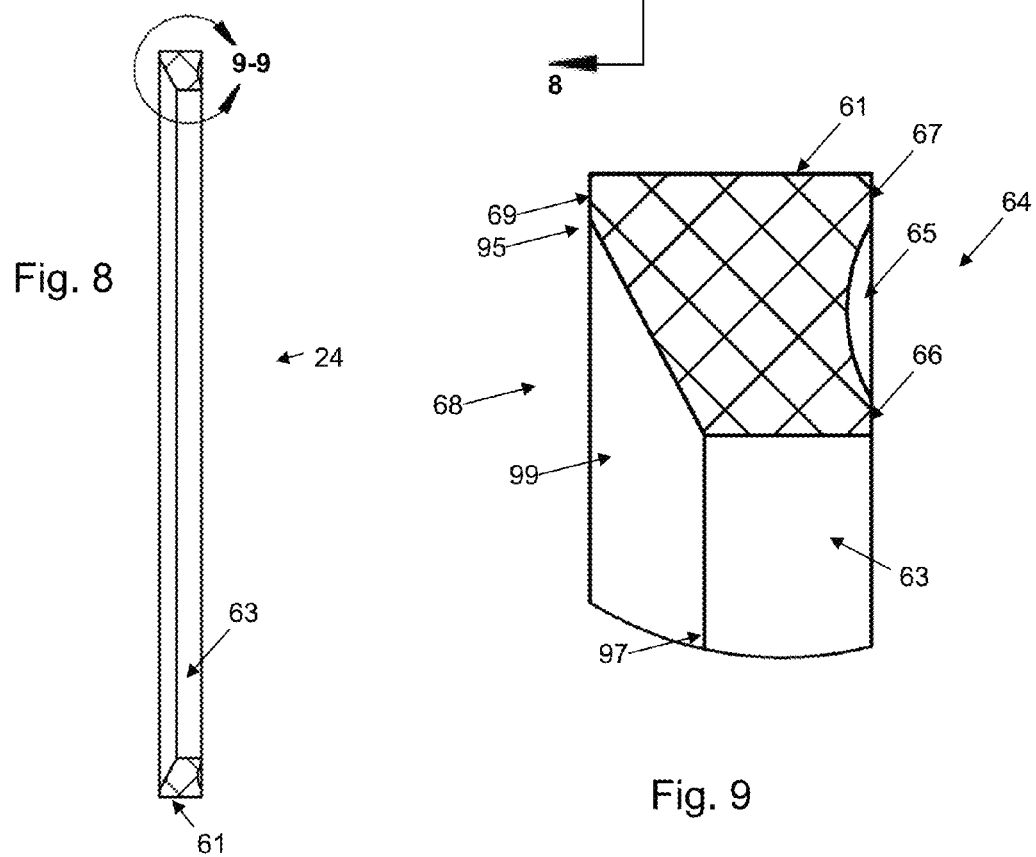
Fig. 8
Fig. 9

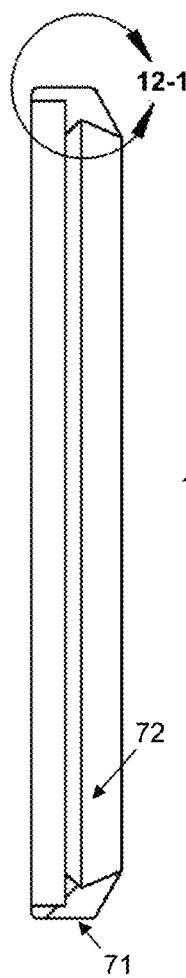
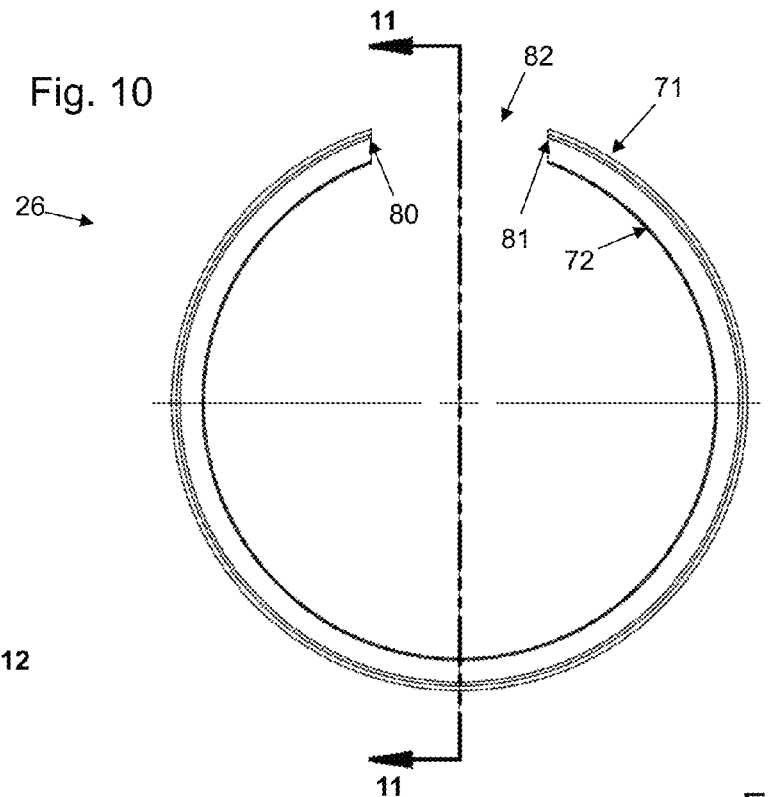

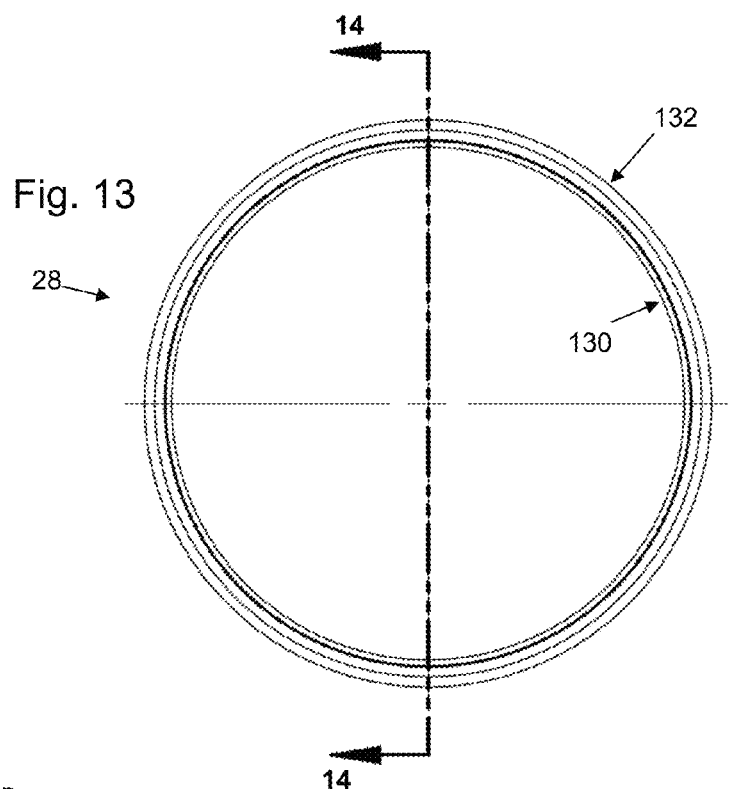
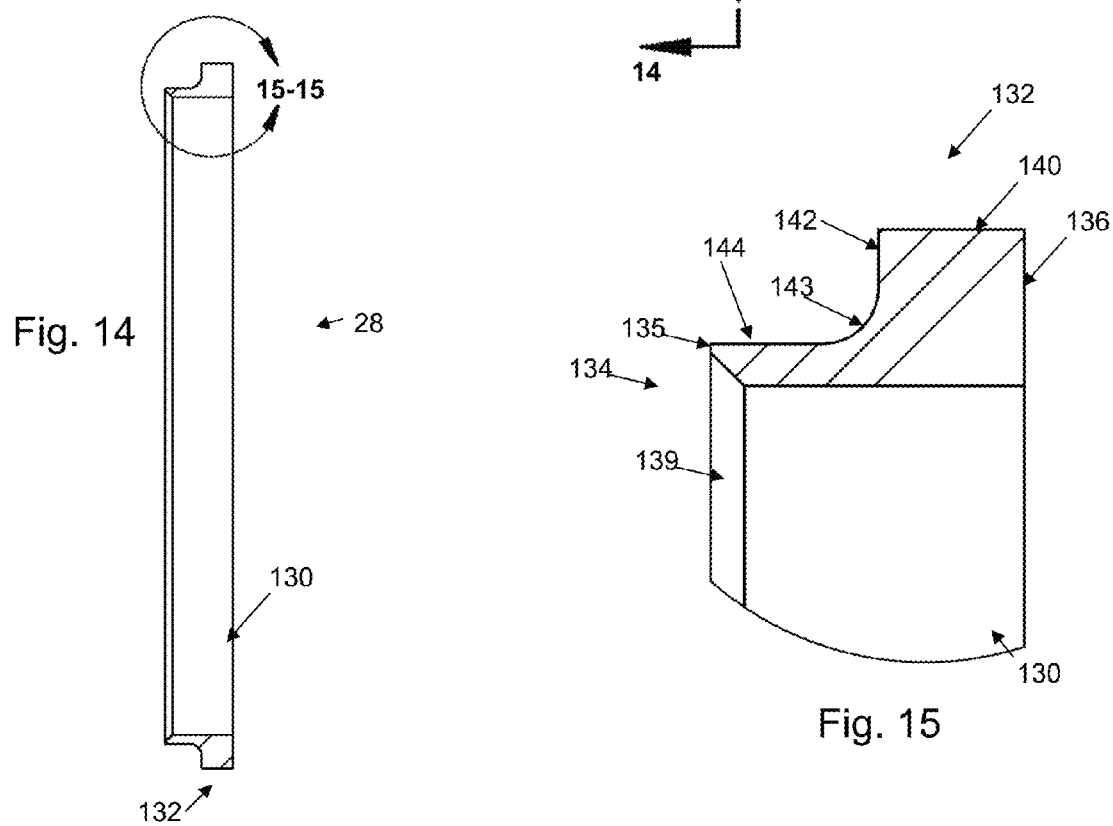

PRESS FITTING DEVICE, COMPONENTS AND METHOD

TECHNICAL FIELD

The present invention relates to fluid flow systems, and more particularly to press fittings with visual indicators for use in fluid flow systems.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride), iron, black iron, ductile iron, gray iron, HDPE (high density polyethylene) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In addition to welding methods, pipe elements have been secured together through pressure. A press fitting, which is also known as a friction fit or an interference fit, is a fastening of parts that takes place through friction after the parts are pushed or compressed together, as opposed to being connected by threads, glue, solder or other methods. Press fittings of fluid flow parts such as plumbing parts can be created by force, through the use of a hand tool, for example. Hand tools, often called press tools, can take the form of a pair of movably engaged jaws similar to a pair of pliers, for example, where the jaws have a head portion of a certain size designed to fit around parts that are to be connected. For instance, a pipe can be inserted into a fitting made of a somewhat compressible material, whereupon pressure can be applied through the press tool to the outside of the fitting in order to compress the fitting around the pipe. It is critical that the press tool be appropriately applied around the entire circumference of the fitting in order to ensure a tight connection. Once connected, the parts can be used for various purposes. In the field of fluid flow, the connected parts can be used to direct the flow of fluids, such as gases, water and other liquids as described above.

Traditional press fittings are frequently improperly sealed or only partially sealed. If an installer has not properly pressed the fitting to provide a permanent seal, fluid can leak, causing great damage and cost. Imperfections or scarring in the tubing being inserted also presents an opportunity for the connection to leak following compression. In many installation environments, installers take work breaks or otherwise become distracted as to which of a number of press fittings have been properly compressed and which have been either improperly compressed or not at all. When this happens, there has been no simple and fast way (other than catastrophic failure or leakage) to determine which fittings have been properly pressed, which can result in lost time spent determining which fittings need to be pressed or in damage in the application environment.

Press-fit technology for piping systems with visual indicators can be obtained, for example, through Quick Fitting, Inc. of Warwick, R.I., USA, suppliers of the CoPro®, ProBite®, LocJaw™, BlueHawk™, CopperHead® and Push Connect® lines of push fittings and related products. Also, such technology is described, for example, in U.S. Pat. No. 8,888,145 and U.S. Pat. No. 9,416,897, the disclosures of which are incorporated herein by reference in their entireties.

The device of the present disclosure, in part, assists in providing one or more visual indicators to assist an individual in determining whether a piping element such as a fitting has been pressed, and whether the correct amount of force has been applied to create a positive and/or permanent seal. For purposes of the present disclosure, it will be appreciated that a fitting can encompass a valve member and other piping elements including, but not limited to: a coupling joint, an elbow joint, a tee joint, a stop end, a ball valve member, tubing and other objects having cylindrical openings. In embodiments of the present invention, a fitting is provided having a main body component, with an interior indicator securely maintained against a portion of the interior wall of the main body component. The interior indicator (which can also be referred to as a membrane seal, indicator seal and/or indicator membrane, for example) is malleable and expandable when properly compressed so as to extend outside of the fitting around an inserted pipe. In this way, an installer, inspector or other individual can visually determine very quickly whether a press fitting has been compressed, and whether there is a proper and complete seal. In various embodiments, the interior indicator has an outer lip that acts as a burr stop, such that an inserted tube with a burr-type imperfection on its outer surface will be locked by the lip of the interior indicator, resisting the ability of the tube to be inserted any further into the main body component.

BRIEF DESCRIPTION OF THE DRAWINGS

FIG. 7 shows a right side view of a lock ring support member according to one embodiment of the present disclosure.

FIG. 8 shows a cross-sectional view of the lock ring support member taken along the line 8-8 of FIG. 7.

FIG. 9 is a detailed view of encircled portion 9-9 of FIG. 8.

FIG. 10 shows a right side view of a lock ring according to one embodiment of the present disclosure.

FIG. 11 shows a cross-sectional view of the lock ring taken along the line 11-11 of FIG. 10.

FIG. 12 is a detailed view of encircled portion 12-12 of FIG. 11.

FIG. 13 shows a right side view of an indicator member according to one embodiment of the present disclosure.

FIG. 14 shows a cross-sectional view of the indicator member taken along the line 14-14 of FIG. 13.

FIG. 15 is a detailed view of encircled portion 15-15 of FIG. 14.

DETAILED DESCRIPTION OF EMBODIMENTS OF THE PRESENT INVENTION

Figure 1:
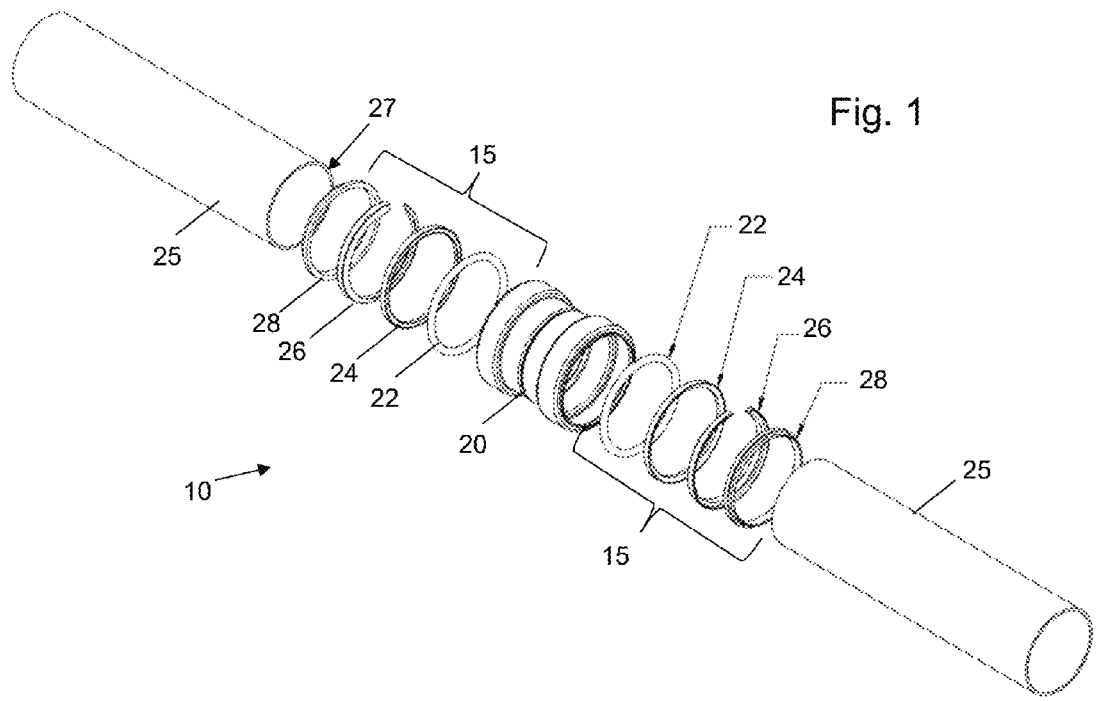
FIG. 1 shows an exploded perspective view of a fitting and components in accordance with one embodiment of the present invention.
Figure 2:
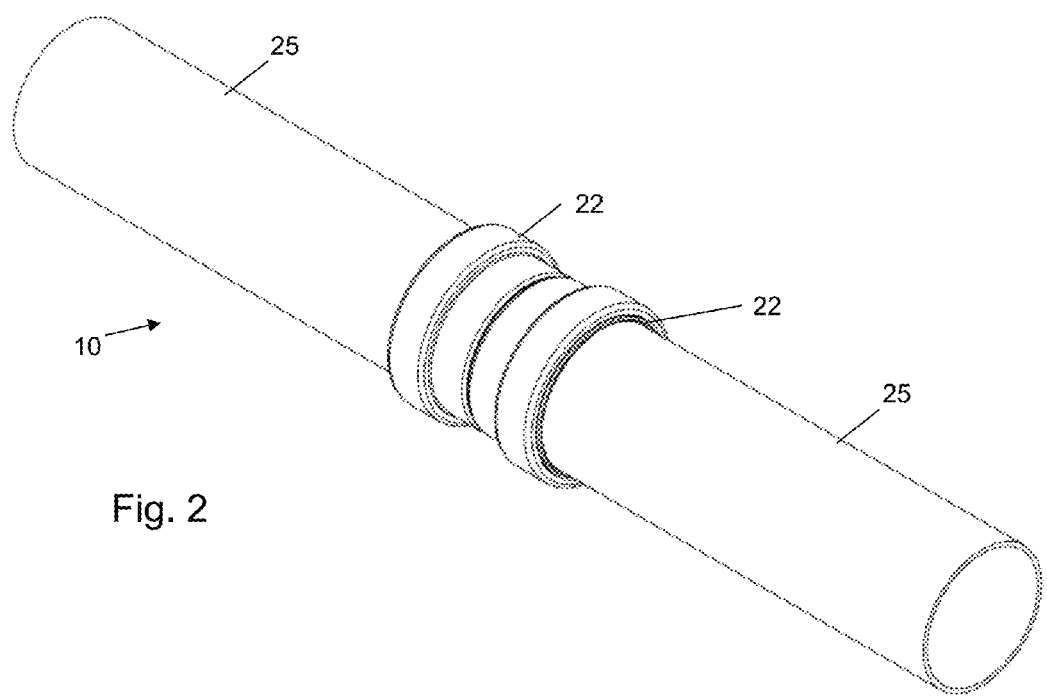
FIG. 2 shows a perspective view of one embodiment of the device of the present disclosure with pipe elements inserted therein.

As shown in FIGS. 1 through 6, the present invention provides a fitting 10 having a somewhat cylindrically shaped main body component 20 with an interior surface 14 and an exterior surface 16. In one embodiment, the main body component 20 can be formed (e.g., forged, cast, extruded, pressed) in brass, aluminum, steel, malleable iron or copper, with full porting and full flow fitting, for example. The interior surface 14 defines a cavity 18 extending through the main body component 20 along a central axis A, and includes a tube stop element 35 extending radially inwardly at the general axial midpoint of the component 20. The tube stop 35 separates the interior 14 into first 31 and second 33 interior compartments, and when a tube 25 of appropriate diameter is inserted into either compartment 31, 33, its axial end wall 27 (see FIG. 1) abuts the tube stop 35 so that the tube cannot be inserted axially further into component 20. It will be appreciated that embodiments of the present disclosure may provide a fitting having only a first interior compartment 31.

Figure 5:
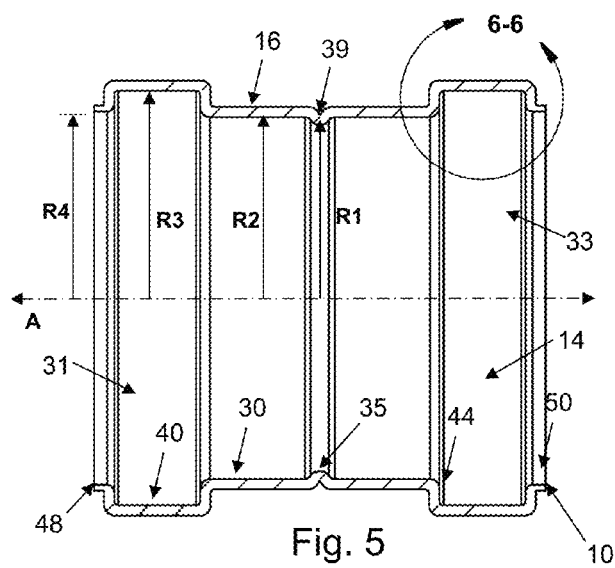
FIG. 5 shows a cross-sectional view of the center body connector taken along the line 5-5 of FIG. 4.
Figure 6:
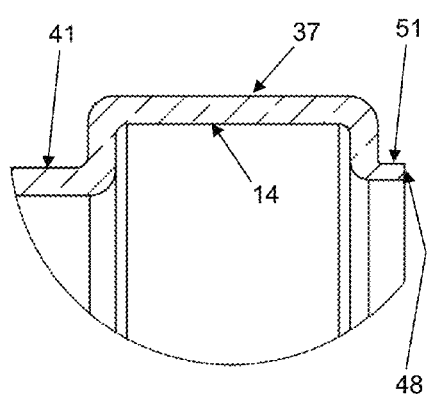
FIG. 6 is a detailed view of encircled portion 6-6 of FIG. 5.
Figure 16:
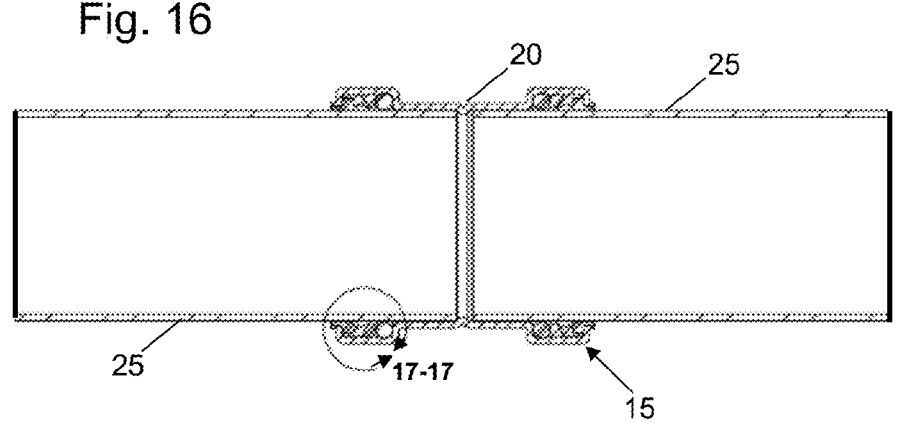
FIG. 16 shows a cross-sectional view of a fitting and components according to the present disclosure, prior to tightening.

As shown in FIG. 5, the interior surface 14 includes an axially inner segment 30, axially intermediate segment 40 and axially outer segment 50. The tube stop 35 extends a radial distance R1 from the axis A. The axially inner segment 30 extends a radial distance R2 from the axis A, the axially intermediate segment 40 extends a radial distance R3 from the axis A, and the axially outer segment 50 extends a radial distance R4 from axis A. In various embodiments, R3 is greater than R1, R2 and R4, and R4 is greater than R2. R1 is the smallest radial measurement so as to provide an appropriate stopping surface for inserted tubes. In various embodiments, when a resilient indicator ring or member 28 is inserted and retained against the axially outer segment 50 of the component interior 14, the radial distance from axis A to the resilient indicator member's radially inner surface is substantially the same as R2, as described more completely herein. The axially inner segment 30 extends axially approximately the same distance as the axially intermediate segment 40, whereas the axially outer segment 50 has a shorter axial length than segments 30 and 40.

Figure 3:
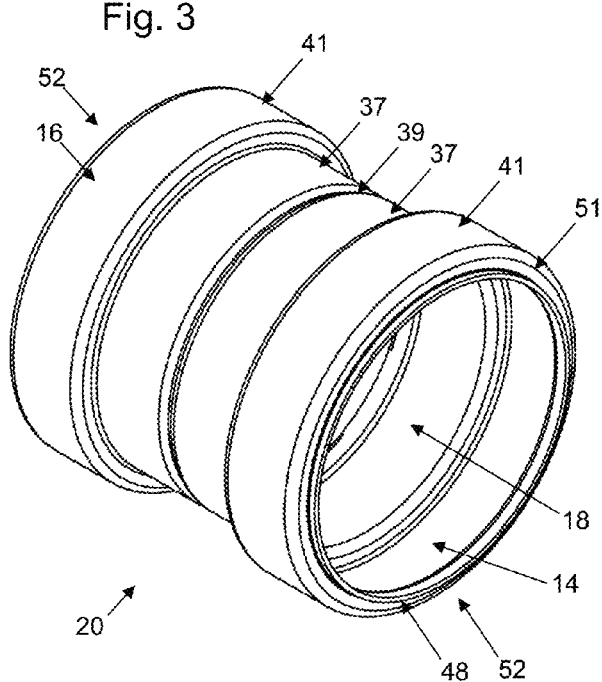
FIG. 3 shows a perspective view of a center body connector according to one embodiment of the device of the present disclosure.
Figure 4:
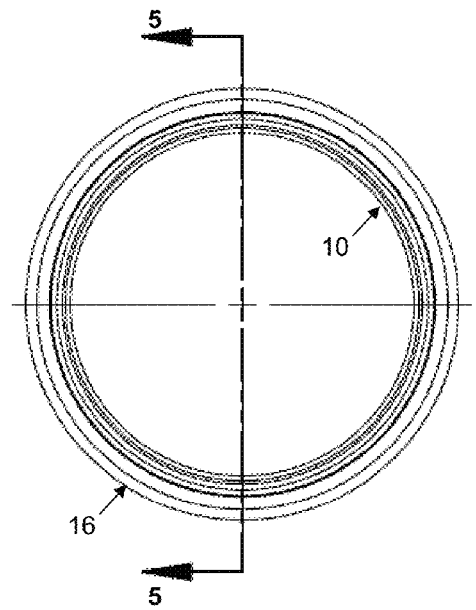
FIG. 4 shows a right side view of the center body connector of FIG. 3.

As shown in FIG. 3, the component outer surface 16 includes an axially inner segment 37, an axially intermediate segment 41 and an axially outer segment 51 that generally correspond on an axial basis with respective axially inner 30, intermediate 40 and outer 50 segments of the component inner surface 14. A radially indented groove 39 can also be provided on the outer surface 16 corresponding to the axial position of the tube stop 35, as shown in FIG. 5. Radially extending end walls 48 are also provided at the axially outermost ends 52 of the component 20.

In various embodiments, the axially outer segment 50 of the component 20 can be provided or compressed into a fluted form, whereby its radius R4 increases as the axially outer segment 50 extends axially outwardly from the axially intermediate segment 40. For example, segment 50 is shown fluted in FIG. 19, with outer wall 48 bending slightly away from ring 28. In this way, the component 20 provides an expanding surface area for the indicator sealing ring 28 to expand into as one or more pipes or tubes (illustrated at 25) are inserted and clamping pressure is applied, as explained in more detail elsewhere herein.

In various embodiments, as shown in FIGS. 1 through 19, a packing arrangement 15 can include one or more of the following components: an o-ring or sealing ring 22, a lock ring support 24, a lock ring 26 and an indicator ring 28. The sealing ring 22 can be a substantially ring-shaped, solid body having a substantially circular body cross-section, and can be formed from a rubber, synthetic or similar non-metallic and compressible material. Optionally, ring 22 can be lubricated with a food grade lubricant, for example. The lock ring 26 can be formed of a metallic material, such as brass, aluminum, steel, malleable iron or copper, in various embodiments. Each of the sealing ring 22, lock ring support 24, lock ring 26 and indicator ring 28 can comprise individual pieces which are not formed together.

As shown in FIGS. 7 through 9, the lock ring support member 24 is a single-piece, ring-shaped member including a radially outer surface 61, a radially inner surface 63, an axially inner surface 64 with a sealing-ring engaging surface 65 positioned radially between radial extensions 66, 67. The lock ring support member 24 can be formed of plastic or metal material, for example. As shown in FIG. 9, radial extension 66 is radially inward of surface 65 and extension 67, and sealing-ring engaging surface 65 is formed so as to be concave, which facilitates strong surface area contact with sealing ring 22. The concave nature of surface 65 also helps prevent the tube from extracting the sealing ring 22 from the cavity 18. Lock ring support member 24 further includes an axially outer surface 68 having a radial extension 69 and back wall 99. As shown in FIG. 9, the radial extension 69 lies radially outwardly of back wall 99, and back wall 99 extends axially and radially inwardly from a back edge 95 to a front edge 97. Back wall 99 is angled as such so as to accommodate the lock ring 26, as described elsewhere herein.

As shown in FIGS. 10 through 12, the lock ring 26 is a single-piece, ring-shaped member including a radially outer surface 71, a radially inner surface 72, an axially outer surface 73 and an axially inner surface 74. The lock ring 26 can be formed of metal, for example, which assists the lock ring in maintaining a rigid form when engaging an inserted pipe, for example. The radially inner surface 72 is provided with a gripping segment 75 comprising first 76 and second 77 fins, with each of the fins extending radially inwardly. In various embodiments, the lock ring 26 can be split, with first 80 and second 81 circumferential end points forming the split 82. In various embodiments, the split nature of the lock ring 26 allows it to compress and/or collapse during insertion into the cavity 18 of component 20, as well as during compression when the outer surface 16 of the component is compressed, effectively narrowing the split. During such operation, the diameter of the lock ring body when compressed becomes less than the diameter of the body when at rest, and the lock ring 26 forms a tighter seal around the inserted pipe 25.

As shown in FIG. 12, the first fin 76 extends radially inwardly a shorter distance than second fin 77, and the first fin 76 has a shorter axial width than second fin 77. In operation, the second fin radially inner edge 85 will engage the pipe outer surface 250 first upon compression, and can effectively dig into the pipe outer wall in order to securely retain the pipe. The second fin radially inner edge 85 is formed at the intersection of the axially inner surface 74 and the second fin interior wall 88. As the packing arrangement 15 is further compressed, the first fin radially inner edge 84 will contact the pipe outer surface 250 to form a type of wedge. The first fin radially inner edge 84 is formed at the intersection of a first fin outer wall 89 and a first fin interior wall 91. As shown in FIG. 12, the first fin outer wall 89 extends substantially radially inwardly from a lock ring base wall 92 to the first fin radially inner edge 84. The first fin interior wall 91 extends radially inwardly and axially outwardly from a hinge edge 86 to the first fin radially inner edge 84. The base wall 92 extends axially inwardly from the axially outer surface 73 to the first fin outer wall 89. The axially outer surface 73 extends substantially radially inwardly from the radial outer surface 71 to the base wall 92, and the axially inner surface 74 extends axially and radially inwardly from the radial outer surface 71 to the second fin radially inner edge 85. The angled nature of axially inner surface 74 facilitates engagement with the back wall 99 of the lock ring support member 24, as shown and described in connection with FIGS. 16 through 19 herein. Further, the substantially perpendicular relationship between base wall 92 and first fin outer wall 89 facilitates engagement with the indicator ring 28, as shown and described in FIGS. 16 through 19.

Figure 21:
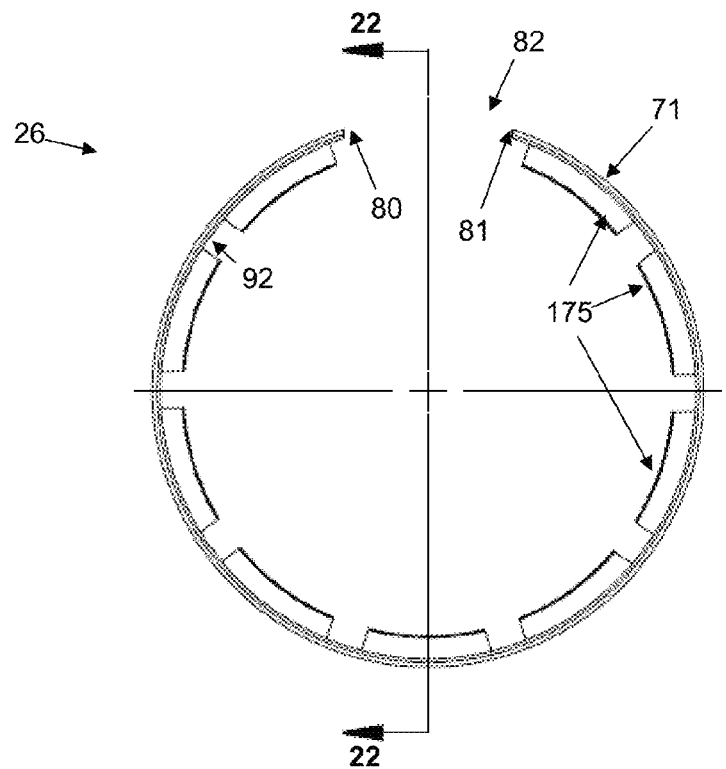
FIG. 21 shows a right side view of an alternative lock ring according to one embodiment of the present disclosure.
Figure 22:
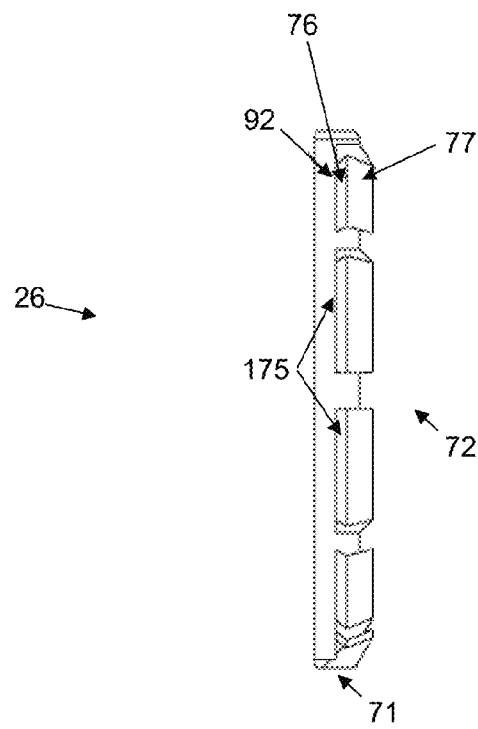
FIG. 22 shows a cross-sectional view of the lock ring taken along the line 22-22 of FIG. 21.

In various embodiments, as illustrated in FIGS. 10 through 12, for example, the gripping segment 75 can extend continuously around the inner circumference of lock ring 26, whereas in other embodiments, as illustrated in FIGS. 21 and 22, the gripping segment is broken into smaller segments 175 that are staggered at intervals along the radially inner surface 72 of the ring 26. In the staggered embodiments, multiple gripping segments 175 can be provided that each extend along anywhere from approximately five degrees of the inner circumference of the ring 26 to approximately ninety degrees of the inner circumference of the ring 26. In a particular embodiment, the range of degree coverage of each of the multiple gripping segments 175 can be from approximately five degrees to approximately fifteen degrees. By having a staggered arrangement, less force is required to compress the lock ring 26 about an inserted pipe 25. It will be appreciated that the staggered gripping segment embodiment of the lock ring 26, as illustrated in FIGS. 21 and 22, can have similar elements to the lock ring 26 of FIGS. 10 through 12, including radially outer surface 71, radially inner surface 72, base wall 92, fins 76, 77, first 80 and second 81 circumferential endpoints forming a split 82, and other elements as described elsewhere herein in connection with FIGS. 10 through 12.

The gripping segment(s) 75, 175 assists in preventing outward movement of an inserted pipe 25. Should the pipe seek to move or escape axially outwardly of the component interior 14, the wedge formed by the fins 76 and 77 will flex about the hinge edge 86, which forces first fin edge 84 further into the pipe outer surface 250 to provide additional retaining strength for retaining the pipe within the fitting cavity.

In various embodiments, as illustrated in FIGS. 13 through 15, an interior indicator 28 is provided in order to provide a visual indication to an installer, inspector or other person that the device disclosed herein has been pressed and that the correct amount of pressure has been applied to create a positive connection, i.e., a permanent seal. The indicator ring 28 is a single-piece, ring-shaped body that is adapted to extend radially outwardly of the radially extending end walls 48 at the axially outermost ends 52 of the component 20 when the packing arrangement 15 is compressed. In various embodiments, the indicator ring 28 can comprise a membrane of low density rubber that is flexible, malleable, resilient and displaceable under pressure, and can be of a special distinctive color to facilitate visual inspection as described herein. In addition to being formed of rubber, the indicator ring 28 can optionally be formed of a plastic, foam or other non-metallic material.

Figure 17:
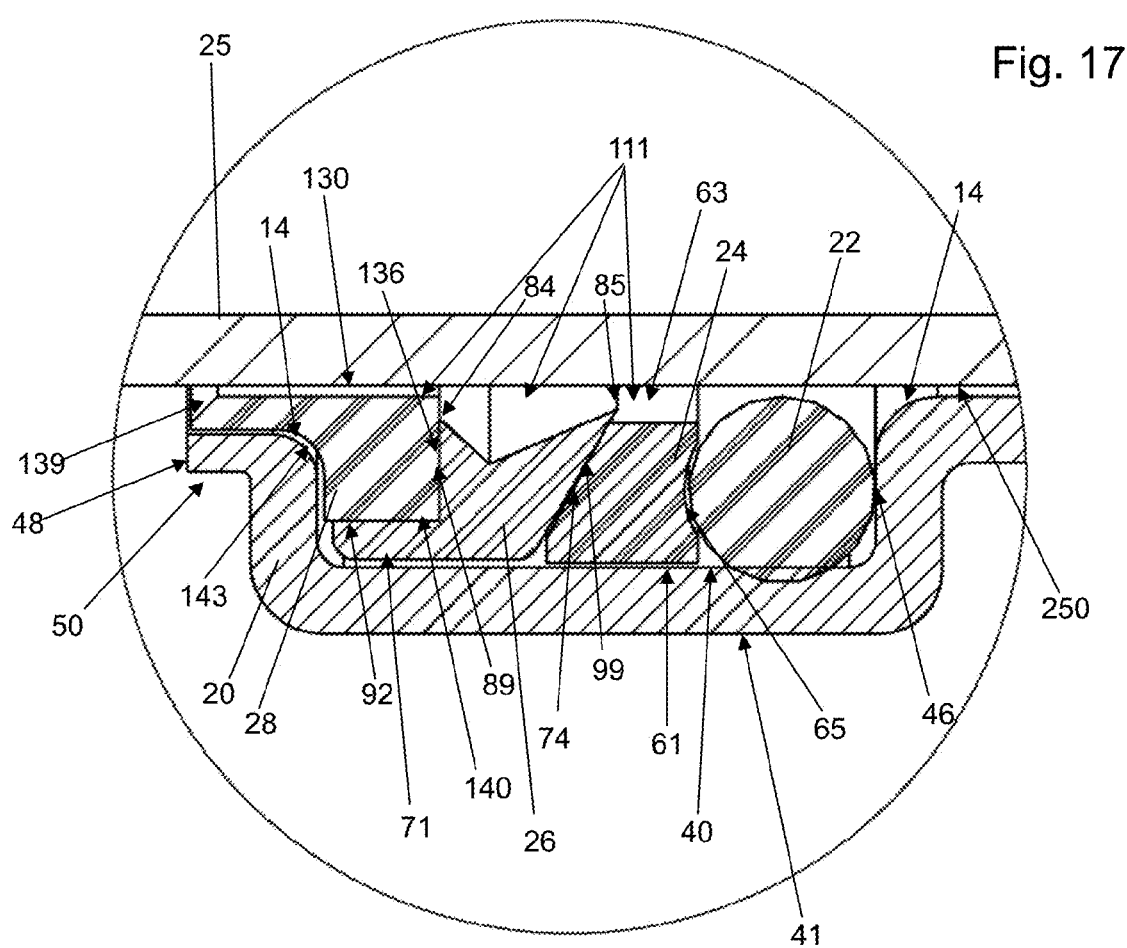
FIG. 17 shows a detailed view of encircled portion 17-17 of FIG. 16.
Figure 18:
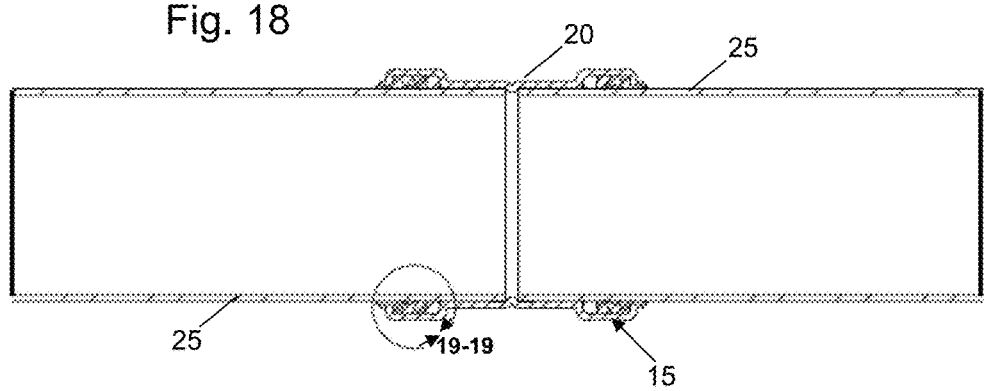
FIG. 18 shows a cross-sectional view of a fitting and components according to the present disclosure, subsequent to tightening.
Figure 19:
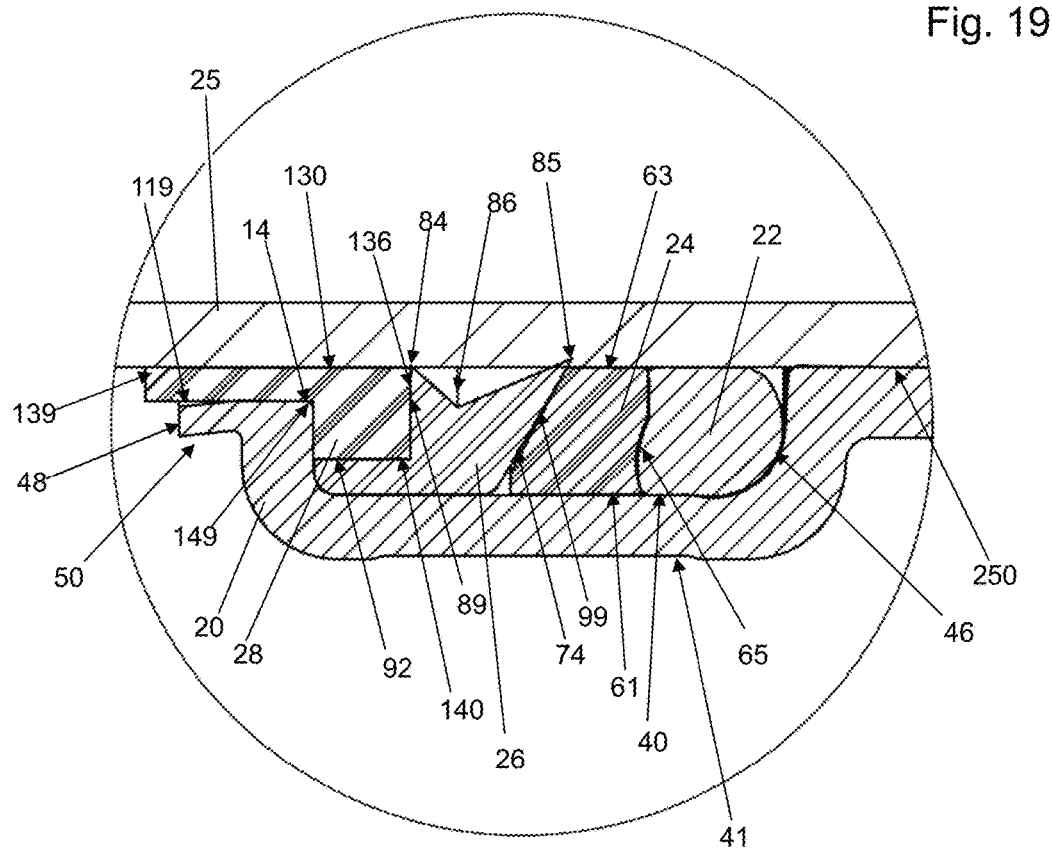
FIG. 19 shows a detailed view of encircled portion 19-19 of FIG. 18.

As shown in FIGS. 13 through 19, the indicator ring 28 includes surfaces that provide structure to support interoperation, connection and engaged movement with other surfaces of other components of the present invention, as shown and described herein. For instance, indicator ring 28 has a radially interior surface 130 and radially exterior surface 132, and further includes an axially exterior surface 134 and axially interior surface 136. The radially interior surface 130 extends exclusively axially, and engages the outer surface 250 of an inserted pipe 25 during operation. The axially interior surface 136 extends exclusively radially. The radially exterior surface 132 includes an axially extending base wall 140, a radially inwardly extending support wall 142, and an axially extending ledge 144 that extends from the support wall 142 to the axially exterior surface 134 of the ring 28. In various embodiments, as shown in FIG. 17, the ring 28 is curved at the transition surface 143 between the support wall 142 and the ledge 144, and this surface 143 facilitates snug connection with the inner surface 14 of the un-pressed component 20, as illustrated in FIG. 17. Once clamping pressure is applied to component 20, such as at the axially intermediate segment 41 of the outer surface of component 20, the inner surface 14 of the axially outer segment 50 of component 20 can form into a squared-off shape, as shown in FIG. 19, and ring 28 is thereby compressed and formed into a substantially perpendicular edge 149 at the intersection of the support wall 142 and ledge 144. Further, the outer wall 48 of the component 20 becomes more fluted in shape upon compression, bending away from the ring 28, as shown in FIG. 19.

The axially interior surface 136 and axially extending base wall 140 of the radially exterior surface 132 securely engage the first fin outer wall 89 and the perpendicular base wall 92, respectively, of the lock ring 26, as shown in FIGS. 17 and 19. The axially exterior surface 134 can include an outer lip 139 angled so as to extend radially and axially inwardly from radially extending segment 135. Radially extending segment 135 extends radially inwardly from support wall 142 of the radially exterior surface 132. The outer lip 139 acts as a burr stop, such that an inserted tube with a burr-type imperfection on its outer surface will be locked by the lip 139 of the indicator 28, resisting the ability of the tube to be inserted any further into the main body component 20.

In operation, as shown in FIG. 17, prior to compression of the packing arrangement, the packing arrangement 15 is inserted into the main body component 20 so as to reside within the axially intermediate segment 40 of the inner surface 14 thereof. The sealing ring 22 is positioned in the axially interior segment 44 against an inner wall 46 of segment 40. The lock ring support member 24 is positioned adjacent the sealing ring 22, with radially outer surface 61 contacting the axially intermediate segment 40 of the interior surface 14, and with the concave surface 65 of the axially inner surface 64 of the support member 24 firmly engaging the outer surface of the sealing ring 22. The lock ring 26 is then inserted into the cavity 18 such that axially inner surface 74 engages the back wall 99 of the lock ring support member 24, and radially outer surface 71 engages the axially intermediate segment 40 of the interior surface 14. Next, the indicator ring 28 is inserted to engage surfaces of component 20 and lock ring 26 as described above. A pipe 25 is then inserted into the cavity 18 with little or no resistance from the packing arrangement or its elements, as the pipe outer surface 250 will be of smaller diameter than the diameters of the uncompressed elements 22, 24, 26 and 28. As shown in FIG. 17, prior to compression, a gap 111 exists between the pipe outer surface 250 and radially inner surfaces 63, 130 of the support member 24 and the indicator ring 28, respectively. Further, as shown in FIG. 17, radially inner edges 84, 85 of the first 76 and second 77 fins, respectively, are not engaged with the inserted pipe 25 when the packing arrangement is uncompressed.

Figure 20:
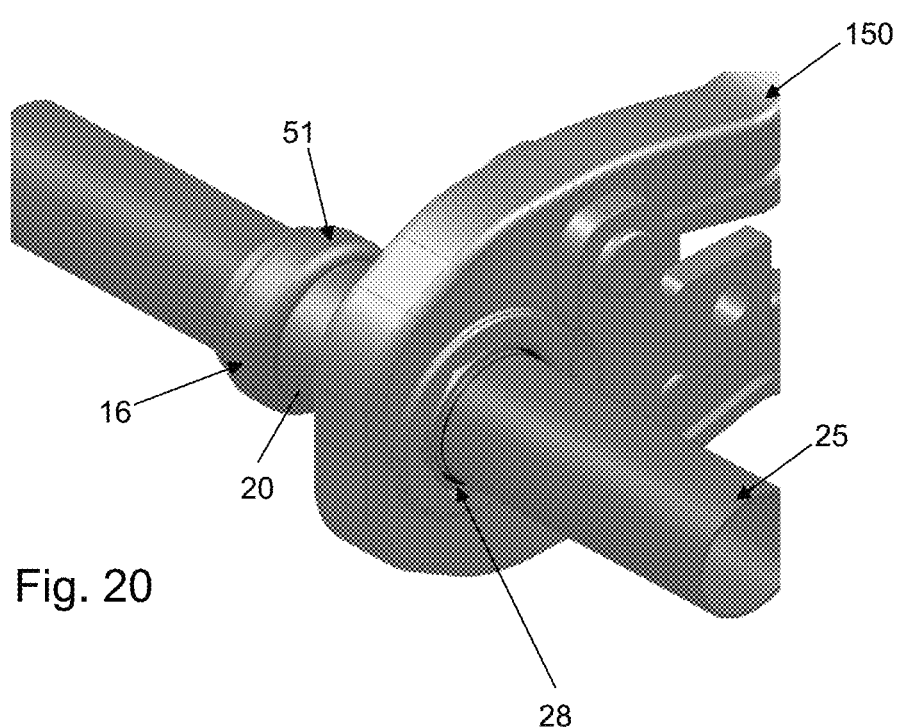
FIG. 20 shows a perspective view of a press tool being applied around one embodiment of the present disclosure with a pipe or tube element insert therein.

As shown in FIG. 20, a press tool 150 can be applied around the axially intermediate segment 51 of the outer surface 16 of the component 20 when a pipe or tube 25 has been inserted into the cavity thereof. As the press tool is properly applied, the sealing member 22, lock ring support member 24, lock ring 26 and indicator ring 28 are drawn into contact with the pipe outer surface 250, as shown in FIG. 19, and the indicator ring 28 is extruded outwardly of the outer wall 48 of the component 20. The gap 111 of FIG. 17 does not exist in FIG. 19 due to the compressive forces; however, a gap 119 can be formed between the inner surface 14 of the axially outer segment 50 and the ring 28 due to the compressive forces. Radially inner edge 85 of the second fin 77 of the lock ring 26 digs in to the outer surface 250 of the pipe 25, and radially inner edge 84 of the first fin 76 of the lock ring 26 can contact or potentially slightly dig in to the outer surface 250 of the pipe 25. As described elsewhere herein, should the pipe 25 seek to move or escape axially outwardly of the component interior 14, the wedge formed by the fins 76 and 77 will flex about the hinge edge 86, which forces first fin edge 84 further into the pipe outer surface 250 to provide additional retaining strength for retaining the pipe within the fitting cavity.

It will thus be appreciated that a single application of the press tool 150 about the circumference of the axially intermediate segment 51 of the component 20 acts to extrude the indicator ring 28 outside of the axially outer end 52 of the component 20. If the ring 28 is viewable around the entire circumference of the pipe 25, then an individual will know that the fitting has been appropriately pressed and properly sealed.

It will be appreciated that the indicator ring 28 can be of sufficient durometer and have sufficient expandable material in order to appropriately extrude outside of the fitting when a tube is inserted, while also filling in voids, scarring or imperfections in the tubing being inserted as well as in the fitting wall. The indicator ring 28 can also be of sufficient durometer in order to roll up or pinch when a pipe or tube is improperly inserted, such as when the pipe or tube is inserted at too oblique an angle into the fitting.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
   a main body component having interior and exterior surfaces, wherein the interior surface defines a cavity extending through the main body component along an axis, and wherein the interior surface includes an axially inner segment, an axially intermediate segment and axially outer segment, wherein the axially intermediate segment has a radial distance from the axis that is greater than a radial distance from the axis to the axially inner segment and is further greater than a radial distance from the axis to the axially outer segment;
   a sealing ring maintained within the axially intermediate segment of the main body component;
   a lock ring support member maintained adjacent the sealing ring and within the axially intermediate segment of the main body component;
   a lock ring maintained adjacent the lock ring support member and within the axially intermediate segment of the main body component, wherein the lock ring includes an axially outer surface, an axially inner surface, a radially outer surface, a radially inner surface, a first fin interior wall, a first fin outer wall and a hinge edge, wherein the lock ring axially outer surface extends substantially radially inwardly from the lock ring radially outer surface to a lock ring base wall, wherein the first fin outer wall extends substantially radially inwardly from the lock ring base wall to a first fin radially inner edge, wherein the first fin interior wall extends radially inwardly and axially outwardly from the hinge edge to the first fin radially inner edge, and further wherein the lock ring axially inner surface extends axially and radially inwardly from the lock ring radial outer surface to a second fin radially inner edge; and an indicator ring comprising an expandable material maintained at least partially within the axially intermediate segment of the main body component and adjacent the lock ring.

2. The fitting of claim 1, wherein each of the sealing ring, lock ring support member, lock ring and indicator ring is formed as a single piece.

3. The fitting of claim 1, wherein the lock ring is formed of metal, the sealing ring is formed of a non-metallic material, the indicator ring is formed of a non-metallic material and the lock ring support member is formed of plastic or metal.

4. The fitting of claim 1, wherein the indicator ring is maintained against the axially outer segment of the interior surface of the main body component.

5. The fitting of claim 4, wherein the indicator ring has a radially inner surface that lies a first radial distance from the axis, wherein the first radial distance is substantially the same as the radial distance to the axially inner segment of the interior surface of the main body component.

6. The fitting of claim 1, wherein the lock ring support member has a radially outer surface and an axially outer surface, and wherein the axially outer surface includes a back wall extending axially and radially inwardly from the radially outer surface.

7. The fitting of claim 6, wherein the lock ring includes a radial outer surface and an axially inner surface, wherein the axially inner surface extends axially and radially inwardly from the radial outer surface.

8. The fitting of claim 7, wherein the lock ring axially inner surface extends axially and radially inwardly from the radial outer surface to a fin radially extending edge.

9. The fitting of claim 1, wherein the second fin radially inner edge extends radially inwardly further than the first fin radially inner edge.

10. The fitting of claim 1, wherein the indicator ring includes a radially interior surface, a radially exterior surface, an axially exterior surface and an axially interior surface, and wherein the radially interior surface extends exclusively axially and the axially interior surface extends exclusively radially.

11. The fitting of claim 10, wherein the radially exterior surface includes an axially extending base wall, a radially inwardly extending support wall, and an axially extending ledge that extends from the support wall to the axially exterior surface of the ring.

12. The fitting of claim 10, wherein the axially exterior surface includes an outer lip extending radially and axially inwardly from a radially extending segment, wherein the radially extending segment extends radially inwardly from the radially exterior surface of the indicator ring.

13. A fitting, comprising:
a main body component having interior and exterior surfaces, wherein the interior surface defines a cavity extending through the main body component along an axis, and wherein the interior surface includes an axially inner segment, an axially intermediate segment and axially outer segment, wherein the axially intermediate segment has a radial distance from the axis that is greater than a radial distance from the axis to the axially inner segment and is further greater than a radial distance from the axis to the axially outer segment; and a packing arrangement maintained at least partially within the axially intermediate segment of the main body component, wherein the packing arrangement includes a lock ring having an axially outer surface, an axially inner surface, a radially outer surface, a radially inner surface, a first fin interior wall, a first fin outer wall and a hinge edge, wherein the axially outer surface extends substantially radially inwardly from the radial outer surface to a base wall, wherein the first fin outer wall extends substantially radially inwardly from the lock ring base wall to a first fin radially inner edge, wherein the first fin interior wall extends radially inwardly and axially outwardly from the hinge edge to the first fin radially inner edge, and further wherein the axially inner surface extends axially and radially inwardly from the radial outer surface to a second fin radially inner edge, and wherein the packing arrangement further includes an indicator ring comprising an expandable material abutting the axially outer surface of the lock ring.

14. The fitting of claim 13, wherein the axially inner segment of the interior surface extends axially approximately the same distance as the axially intermediate segment of the interior surface.

15. The fitting of claim 13, wherein the axially inner and intermediate segments of the fitting interior extend axially further than the axially outer segment of the fitting interior.

16. The fitting of claim 13, wherein the second fin radially inner edge extends radially inwardly further than the first fin radially inner edge.

17. The fitting of claim 13, wherein the indicator ring includes a radially interior surface, a radially exterior surface, an axially exterior surface and an axially interior surface, and wherein the radially interior surface extends exclusively axially and the axially interior surface extends exclusively radially.

18. The fitting of claim 17, wherein the radially exterior surface includes an axially extending base wall, a radially inwardly extending support wall, and an axially extending ledge that extends from the support wall to the axially exterior surface of the ring.

19. The fitting of claim 17, wherein the axially exterior surface includes an outer lip extending radially and axially inwardly from a radially extending segment, wherein the radially extending segment extends radially inwardly from the radially exterior surface of the indicator ring.

* * * * *